US010375718B2

(12) United States Patent
Manolakos et al.

(10) Patent No.: US 10,375,718 B2
(45) Date of Patent: Aug. 6, 2019

(54) ADAPTIVE RESOURCE MANAGEMENT FOR ROBUST COMMUNICATION IN NEW RADIO

(71) Applicant: QUALCOMM Incorporated, San Diego, CA (US)

(72) Inventors: Alexandros Manolakos, San Diego, CA (US); Jing Jiang, San Diego, CA (US); Seyong Park, San Diego, CA (US); Hao Xu, San Diego, CA (US); Wanshi Chen, San Diego, CA (US); Wei Zeng, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 15/450,216

(22) Filed: Mar. 6, 2017

(65) Prior Publication Data

US 2018/0049222 A1    Feb. 15, 2018

Related U.S. Application Data

(60) Provisional application No. 62/373,760, filed on Aug. 11, 2016.

(51) Int. Cl.
*H04W 72/12* (2009.01)
*H04W 76/28* (2018.01)
(Continued)

(52) U.S. Cl.
CPC ....... *H04W 72/1263* (2013.01); *H04L 1/0007* (2013.01); *H04L 5/0007* (2013.01);
(Continued)

(58) Field of Classification Search
CPC ........... H04W 72/1263; H04L 25/0202; H04L 5/0048
See application file for complete search history.

(56) References Cited

U.S. PATENT DOCUMENTS

| 2003/0012175 A1* | 1/2003 | Sebire | H04B 7/2659 370/347 |
| 2010/0278083 A1* | 11/2010 | Kwak | H04B 7/26 370/280 |

(Continued)

FOREIGN PATENT DOCUMENTS

WO    WO-2016/130175 A1    8/2016

OTHER PUBLICATIONS

Huawei et al., "Scenario & Design Criteria on Flexible Numerologies", 3GPP TSG RAN WG 1 Meeting #84bis, R1-162156, Apr. 2, 2016, XP051080002, Retrieved from the Internet: URL:http://www.3gpp.org/ftp/tsg_ran/WG1_RL1/TSGR1_84b/Docs/, 7 pages.

(Continued)

*Primary Examiner* — Asad M Nawaz
*Assistant Examiner* — Syed Ali
(74) *Attorney, Agent, or Firm* — Arent Fox LLP

(57) ABSTRACT

The present disclosure provides for adaptive resource management in new radio operations that favors the usage of resources for pilot signals and channel estimation in the transition slots of a slot burst, and the transmission of data in the subsequent slots of the slot burst. A device such as a user equipment (UE) and/or a base station may determine that the UE is operating in a transition state. The device may adapt a first numerology including a first number of symbols per slot used for transmission in the transition slots during the transition state, to a second scaled numerology including a second number of symbols per slot used for transmission in the subsequent slots after the transition state. A ratio of reference signal symbols to data symbol symbols may be greater in the transition slots than in the subsequent slots.

28 Claims, 8 Drawing Sheets

(51) Int. Cl.
  *H04W 76/27* (2018.01)
  *H04L 5/00* (2006.01)
  *H04L 25/02* (2006.01)
  *H04L 27/26* (2006.01)
  *H04W 52/18* (2009.01)
  *H04L 1/00* (2006.01)
  *H04W 28/18* (2009.01)

(52) U.S. Cl.
  CPC .......... *H04L 5/0048* (2013.01); *H04L 5/0082* (2013.01); *H04L 25/0202* (2013.01); *H04L 25/0224* (2013.01); *H04L 27/2601* (2013.01); *H04L 27/2602* (2013.01); *H04L 27/2613* (2013.01); *H04W 52/18* (2013.01); *H04W 76/27* (2018.02); *H04W 76/28* (2018.02); *H04L 5/001* (2013.01); *H04L 5/0023* (2013.01); *H04L 5/0064* (2013.01); *H04W 28/18* (2013.01)

(56) References Cited

U.S. PATENT DOCUMENTS

| | | | |
|---|---|---|---|
| 2014/0185539 A1* | 7/2014 | Seo | H04B 7/2656 370/329 |
| 2016/0036576 A1 | 2/2016 | Wang | |
| 2016/0037550 A1* | 2/2016 | Barabell | H04B 17/318 455/450 |
| 2016/0183287 A1 | 6/2016 | Groh et al. | |
| 2016/0242153 A1* | 8/2016 | Chen | H04L 5/0098 |
| 2016/0255641 A1 | 9/2016 | Koorapaty et al. | |
| 2016/0323909 A1* | 11/2016 | Lin | H04W 72/1263 |
| 2016/0338081 A1 | 11/2016 | Jiang et al. | |
| 2017/0019887 A1* | 1/2017 | Jiang | H04W 72/042 |
| 2017/0127413 A1* | 5/2017 | Guan | H04W 72/0446 |
| 2017/0331670 A1* | 11/2017 | Parkvall | H04J 11/0079 |
| 2018/0324631 A1* | 11/2018 | Jheng | H04W 28/0263 |
| 2018/0324842 A1* | 11/2018 | Gulati | H04W 72/1278 |

OTHER PUBLICATIONS

International Search Report and Written Opinion—PCT/US2017/044479—ISA/EPO—dated Oct. 26, 2017. 14 pages.

Mediatek Inc: "Discussion on Resource Allocation of NB-PUSCH", 3GPP DRAFT; R1-160774, 3rd Generation Partnership Project (3GPP), Mobile Competence Centre, 650, Route Des Lucioles, F-06921, Sophia-Antipolis Cedex, France, Feb. 6, 2016, XP051064375, Retrieved from the Internet: URL:http://www.3gpp.org/ftp/tsg_ran/WG1_RL1/TSGR1_84/Docs/ [retrieved on Feb. 6, 2016], 3 pages.

ZTE Corporation et al., "On Forward Compatibility for New Radio Interface", 3GPP DRAFT; R1-164292, 3rd Generation Partnership Project (3GPP), Mobile Competence Centre, 650, Route Des Lucioles, F-06921, Sophia-Antipolis Cedex, France, vol. RAN WG1, No. Nanjing, China; May 14, 2016, XP051090009, Retrieved from the Internet: URL:http://www.3gpp.org/ftp/tsg_ran/WG1_RL1/TSGR1_85/Docs/ [retrieved on May 14, 2016], 4 pages.

* cited by examiner

ADAPTIVE RESOURCE MANAGEMENT FOR ROBUST COMMUNICATION IN NEW RADIO

CLAIM OF PRIORITY UNDER 35 U.S.C. § 119

The present Application for Patent claims priority to Provisional Application No. 62/373,760 entitled "ADAPTIVE RESOURCE MANAGEMENT FOR ROBUST COMMUNICATION IN NEW RADIO" filed Aug. 11, 2016, which is assigned to the assignee hereof, and incorporated herein by reference in its entirety.

BACKGROUND

Aspects of this disclosure relate generally to telecommunications, and more particularly to resource management in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

It is envisaged that 5G NR will, in some cases, be deployed in time division duplexing (TDD) bands using very large spectrum (e.g., greater than 100 MHz). Due to the large spectrum, devices may be able to complete transmission of available data relatively quickly. Accordingly, the transmission pattern for 5G NR may be bursty in nature. The bursty transmission pattern allows the user equipment (UE) to more frequently utilize a sleep operation (e.g., discontinuous reception (DRX)) for power savings. The UE may be in a sleep state, then wake up for a short period of time to receive and/or transmit data, then return to the sleep state.

Network capacity improvements by 5G communications technology in terms of, for example, spectral and energy efficiency may nonetheless adversely impact some aspects of existing technologies. For example, it is well known that orthogonal frequency-division multiplexing (OFDM) systems and single carrier frequency-division multiplexing (SC-FDM) system are relatively sensitive to noise and interference. Particularly, in order to transfer data correctly between the UE and a network, the UE and the base station (e.g., evolved Node B), generally use channel estimation to filter out noise and/or interference. In bursty transmission patterns, however, there may not be enough time for enhancing the channel estimates through across-slot filtering. For example, a UE may wake up for only a few slots. By the time the UE and base station transmit enough reference signals to build channel estimation filters, the burst may be complete.

SUMMARY

The present disclosure provides for adaptive resource management that favors the usage of resources for pilot signals and channel estimation in the first slots of a slot burst, and the transmission of data in the later slots of a slot burst.

In an aspect, the disclosure provides a method of resource adaptation for wireless communications. The method includes determining that a UE is operating in a transition state. The method also includes transmitting, using a first numerology including a first number of symbols per slot, a first transmission having a first ratio of reference signal symbols to data symbols, for at least one transition slot while the UE is operating in the transition state. The method further includes adapting the first numerology, in a subsequent slot after the transition state, to a scaled numerology including a second number of symbols per slot, according to a defined adaptation schedule. The method additionally includes transmitting, using the scaled numerology, a second transmission having a second ratio of reference signal symbols to data symbols, in the subsequent slot. The first ratio may be greater than the second ratio.

In another aspect, the disclosure provides an apparatus for wireless communications. The apparatus includes a processor and a memory coupled to the processor. The memory includes instructions executable by the processor to determine that a UE is operating in a transition state. The processor is further configured to transmit, using a first numerology including a first number of symbols per slot, a first transmission having a first ratio of reference signal symbols to data symbols, for at least one transition slot while the UE is operating in the transition state. The processor is further configured to adapt the first numerology, in a subsequent slot after the transition state, to a second scaled numerology including a second number of symbols per slot according to a defined adaptation schedule. The processor is further configured to transmit, using the second scaled numerology, a second transmission having a second ratio of reference signal symbols to data symbols, in the subsequent slot, wherein the first ratio is greater than the second ratio.

In another aspect, the disclosure provides another apparatus for wireless communication. The apparatus includes means for determining that a UE is operating in a transition state. The apparatus further includes means for transmitting, using a first numerology including a first number of symbols per slot, a first transmission having a first ratio of reference signal symbols to data symbols, for at least one transition slot while the UE is operating in the transition state. The apparatus further includes means for adapting the first numerology, in a subsequent slot after the transition state, to a scaled numerology including a second number of symbols per slot, according to a defined adaptation schedule. The means for transmitting may also be configured to transmit, using the scaled numerology, a second transmission having a second ratio of reference signal symbols to data symbols, in the subsequent slot. The first ratio may be greater than the second ratio.

In another aspect, the disclosure provides a computer readable medium for wireless communication. The computer readable medium includes code for determining that a UE is operating in a transition state. The computer readable medium includes code for transmitting, using a first numerology including a first number of symbols per slot, a first transmission having a first ratio of reference signal symbols to data symbols, for at least one transition slot while the UE is operating in the transition state. The computer readable medium includes code for adapting the first numerology, in a subsequent slot after the transition state, to a scaled numerology including a second number of symbols per slot, according to a defined adaptation schedule. The computer readable medium includes code for transmitting, using the scaled numerology, a second transmission having a second ratio of reference signal symbols to data symbols, in the subsequent slot. The first ratio may be greater than the second ratio.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
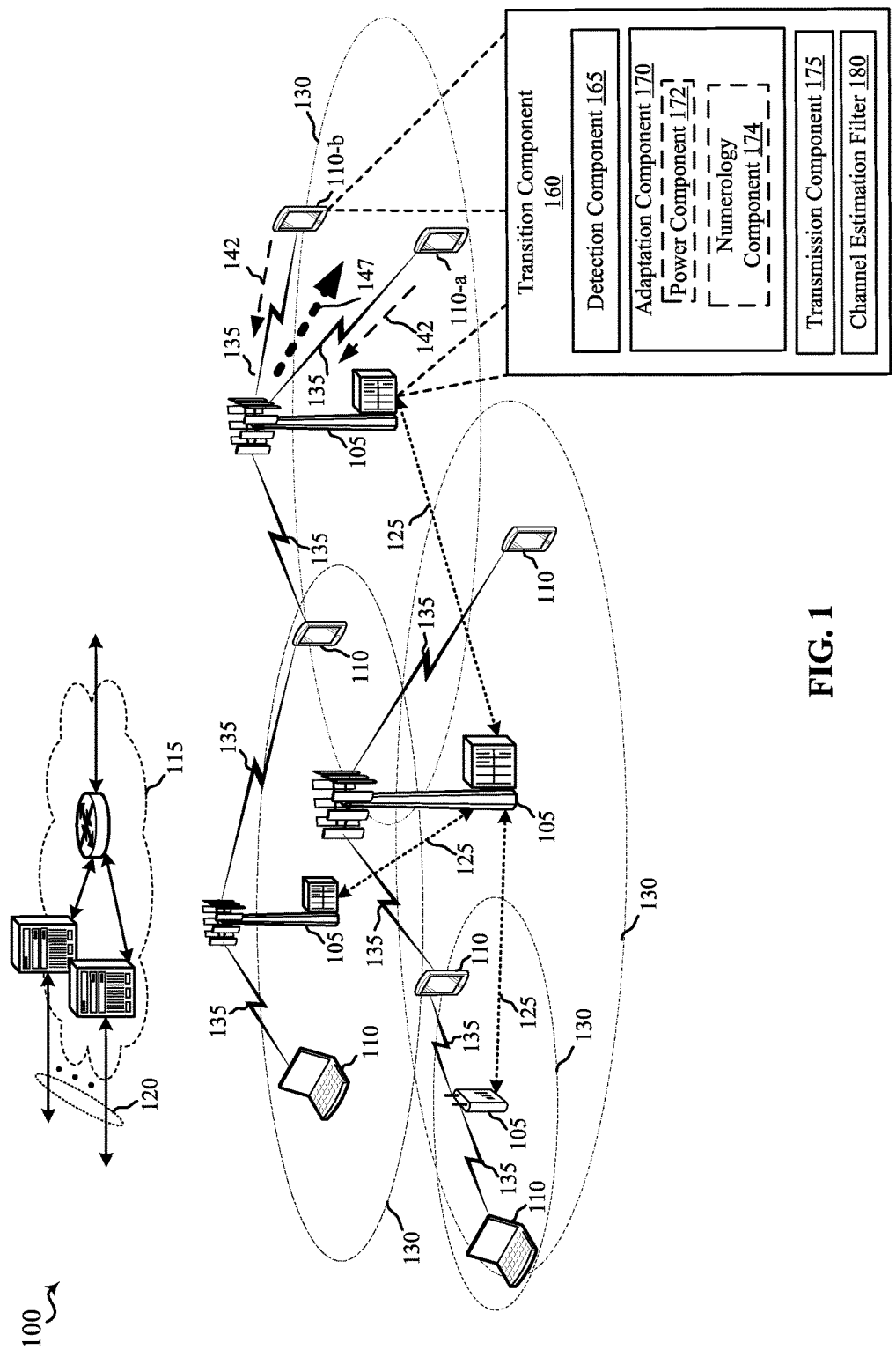
FIG. 1 is a schematic diagram of a wireless communication network in accordance with an example implementation of the present disclosure.

As discussed above, emerging 5G or New Radio (NR) communications technology, may employ large spectrum and have a bursty transmission pattern. The transmission pattern may be organized as a series of slots. As used herein, the term "slot" may refer to a time period during which a UE may be scheduled for communication. For example, the time period referred to as a "subframe" in 4G/LTE terminology may be considered a slot. In 5G/NR a slot may have a different duration depending on a current configuration. Slots may be a self-contained and do not necessarily rely on a fixed frame structure to define the contents or format of a slot.

Generally, existing technologies utilize channel estimation filters to improve reception of signals by filtering out noise and interference by averaging or generally performing across-slot channel estimation procedures. In the case of bursty transmissions, such channel estimation filters may become outdated during a sleep operation and no longer be effective. When the next burst starts, the channel estimation filters may not have enough time to become as effective before the UE returns to the sleep operation. Similarly, when the UE is experiencing varying channel conditions (e.g., high Doppler effects), channel estimation filters may also be ineffective.

One technique for improving channel estimation filters in the case of bursty communications is to provide special wake-up slots including additional sounding reference signals (SRS). The wake-up slots may be uplink centric slots in a TDD transmission pattern. The additional SRS allows the base station to more quickly build a channel estimation filter. In an aspect, the channel estimation filter may improve the ability of the base station to correctly decode a transmission from the UE, especially for single bit control information such as acknowledgments (ACK) or negative acknowledgments (NACK). For example, the use of channel estimation filters may decrease the required signal-to-noise ratio (SNR) or signal-to-noise plus interference ratio (SINR) for reliable reception of ACK/NACK by several decibels (dB). The use of wake-up slots, however, may not be as effective or efficient in the case of short bursts.

In an aspect, the present disclosure provides for adaptive resource management that favors the usage of resources for pilot signals and channel estimation in the first slots of a burst and the transmission of data in the later slots of the burst. The first slots in the burst may be referred to as transition slots or cold-start slots and the UE may be considered to be operating in a transition state when transmitting or receiving transition slots. Various transmission properties may be adjusted by both the UE and the base station as the UE switches from the transition state to transmit in a normal state in subsequent slots. The adjustment of the transmission properties may be according to a defined schedule. The schedule may be defined in a standard, configured for an individual UE via physical layer signaling (e.g., a physical downlink control channel (PDCCH)) or higher layer signaling (e.g., radio resource control), or broadcast by the base station (e.g., in system information blocks (SIB)). In an aspect, transmission properties that may be adapted between transition slots and subsequent slots include a numerology, transmission powers for various channels, symbol waveforms, and time density and/or frequency density of reference signals.

Various aspects are now described in more detail with reference to the FIGS. 1-10. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 having a transition component 160 configured to perform one or more techniques described herein. A base station 105 may also include a transition component 160 configured to perform similar or complementary techniques described herein at the base station 105.

In particular, transition component 160 may include a detection component 165 configured to determine whether the UE 110 is operating in a transition state. Generally, the UE may operate in a transition state whenever the UE or the base station does not have an effective channel estimation filter. For example, the channel estimation filter may be out of date due to a period of inactivity or due to changing channel conditions. Specifically, detection component 165 may determine whether the UE is operating in a transition state according to one or more defined rules. For example, the UE may operate in a transition state when the UE 110 first establishes a connection with the base station. As another example, the UE may operate in a transition state when the UE 110 exits a DRX mode. In another example, the UE may operate in the transition state when the UE or base station determines that a channel estimation filter is not effective. For example, the UE or base station may detect a number or percentage of reception failures or detect a metric (e.g., Doppler shift) that indicates changing channel conditions. The base station 105 may signal to the UE 110 that the UE 110 should switch to the transition state. The detection component 165 at the UE 110 may detect signals from the base station 105.

The transition state may be a defined number of slots (e.g., 1-5). The number of slots may be defined according to a schedule. During the transition state, the UE 110 and/or the base station 105 may adapt transmission properties. In an aspect, one or more transmission properties may have a first value during the transition state and a different value in a slot subsequent to the transition state. In another aspect, where the transition state includes multiple slots, the one or more transmission properties may also be adapted between slots of the transition state. The transmission properties may not change once the UE 110 has left the transition state. For example, a scaled numerology may be adapted during the transition state to allow a gradual decrease in a ratio of reference signal symbols to data symbols. Once the UE 110 leaves the transition state, the UE 110 may no longer adapt the transmission property. The one or more transmission properties used for the subsequent slot may be used for remaining slots in the slot burst.

In some examples of the present disclosure, the transition component 160 may further include adaptation component 170 for adapting a first transmission property used in the transition state to a second transmission property in a slot subsequent to the transition state. After the UE 110 has transmitted or received the one or more transition slots using a first transmission property, the adaptation component 170 may change the first transmission property to a second transmission property. Adapting or changing the transmission property may involve an adaptation or change in the characteristics, features, or attributes of a property, including an adaptation or a change in the value. For example, the adaptation component 170 may change the transmission power of one or more channels. As another example, the adaptation component 170 may change a numerology and/or a ratio of reference signal symbols to data symbols. In another aspect, the adaptation component 170 may change the waveform of a specific symbol. In another aspect, the adaptation component 170 may change a ratio of reference signal resource elements to data resource elements.

In an aspect, the adaptation component 170 may optionally include power component 172 for adapting a transmission power of the UE 110 or base station 105. In a transition slot, the UE 110 may transmit specific signals or channels with a higher power if the UE 110 is not set to transmit with a maximum power based on current conditions. For example, the UE 110 may transmit physical layer channels that typically carry pilot signals such as the SRS and/or physical channels that carry payload such as PUCCH or PUSCH with higher power in the transition slots. The base station 105 may also adapt its transmission power for transition slots. For example, the base station 105 may transmit physical layer channels including pilots such as sounding reference signal (SRS), a demodulation reference signal (DMRS), a cell reference signal (CRS), and/or physical layer channels that carry a payload such as a physical downlink shared channel (PDSCH), and/or a physical downlink control channel (PDCCH) with a higher transmission power. As another example, a reference signal (RS) bearing channel and a data-bearing channel may be boosted, or one of the channels may be boosted in comparison to a transmission power in a subsequent slot. In any case, the UE 110 and base station 105 may agree on an RS/Data power ratio, which may be determined according to the adaptation schedule. Further, the power component 172 may adapt a change in transmission power ("delta") applied to the transmission power based on the adaptation schedule. For example, during the transition state, the UE 110 may increase or decrease the transmit power in steps of 3 decibels (dB), whereas in the subsequent slots the UE 110 may increase or decrease the transmit power in steps of 1 dB for the same power control command. Accordingly, the interpretation of the power control commands may be adapted between slots. Further, the adaptation schedule may establish a base transmit power. The base transmission power may be based on a transmission power used prior to a DRX state. The base transmission power may also be signaled to the UE 110 via PDCCH, a SIB, or higher layer signaling. Additionally, the adaptation schedule with respect to power adaptation across slots may be configurable for an individual UE 110, predetermined in a standard, or indicated for all UEs served by the base station 105.

In an aspect, the adaptation component 170 may optionally include numerology component 174 for adapting a numerology used by the UE 110 or base station 105 for transmissions. For example, the numerology component 174 may adapt a first numerology used for transmissions in a transition state to a second numerology used for transmissions in a subsequent slot after the transition state. As discussed in further detail below, the second numerology may be a scaled numerology. The numerology component 174 may also adapt a ratio of reference signal symbols to data symbols used in the transition state and/or the subsequent slots. For example, the numerology component 174 may adjust the ratio such that the ratio is greater during the transition state than during the subsequent slots. Accordingly, transmissions using the greater ratio of reference signal symbols to data symbols may be easier to decode when a channel estimation filter 180 is not available or is otherwise deficient.

Additionally, the transition component 160 may further include a transmission component 175 for transmitting according to the transmission properties determined by the detection component 165 and/or the adaptation component 170. For example, the transmission component 175 may transmit according to properties determined by the detection component 165 when the UE 110 is in the transition state for transition slots. In slots subsequent to the transition state, the transmission component 175 may transmit according to transmission properties determined by the adaptation component 170.

The transition component 160 may also include a channel estimation filter 180 for filtering received signals. In an aspect, the channel estimation filter 180 may become outdated or reset when the UE 110 experiences an interruption in communications such as entering a DRX state. As the UE begins a new slot burst, the transition component 160 may build up the channel estimation filter 180 based on reference signals transmitted in the slots.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, a radio transceiver, a NodeB, eNodeB (eNB), a gNodeB (gNB), transmit-receive point (TRP), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 130 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. Moreover, the wireless communication network 100 may support high frequency operations such as millimeter wave communications. In LTE/LTE-A networks, the term evolved node B (eNB) may be generally used to describe the base stations 105, while the term UE may be generally used to describe the UEs 110. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, relay base stations, and the like.

A UE 110 may be configured to establish one or more wireless communication links 135 with one or more base stations 105. The wireless communication links 135 shown in wireless communication network 100 may carry UL transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple subcarriers (e.g., waveform signals of different frequencies) modulated according to the various radio technologies described above. Each modulated signal may be sent on a different subcarrier and may carry control information (e.g., reference signals, control channels, etc.), overhead information, user data, etc. In an aspect, the communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

Figure 2:
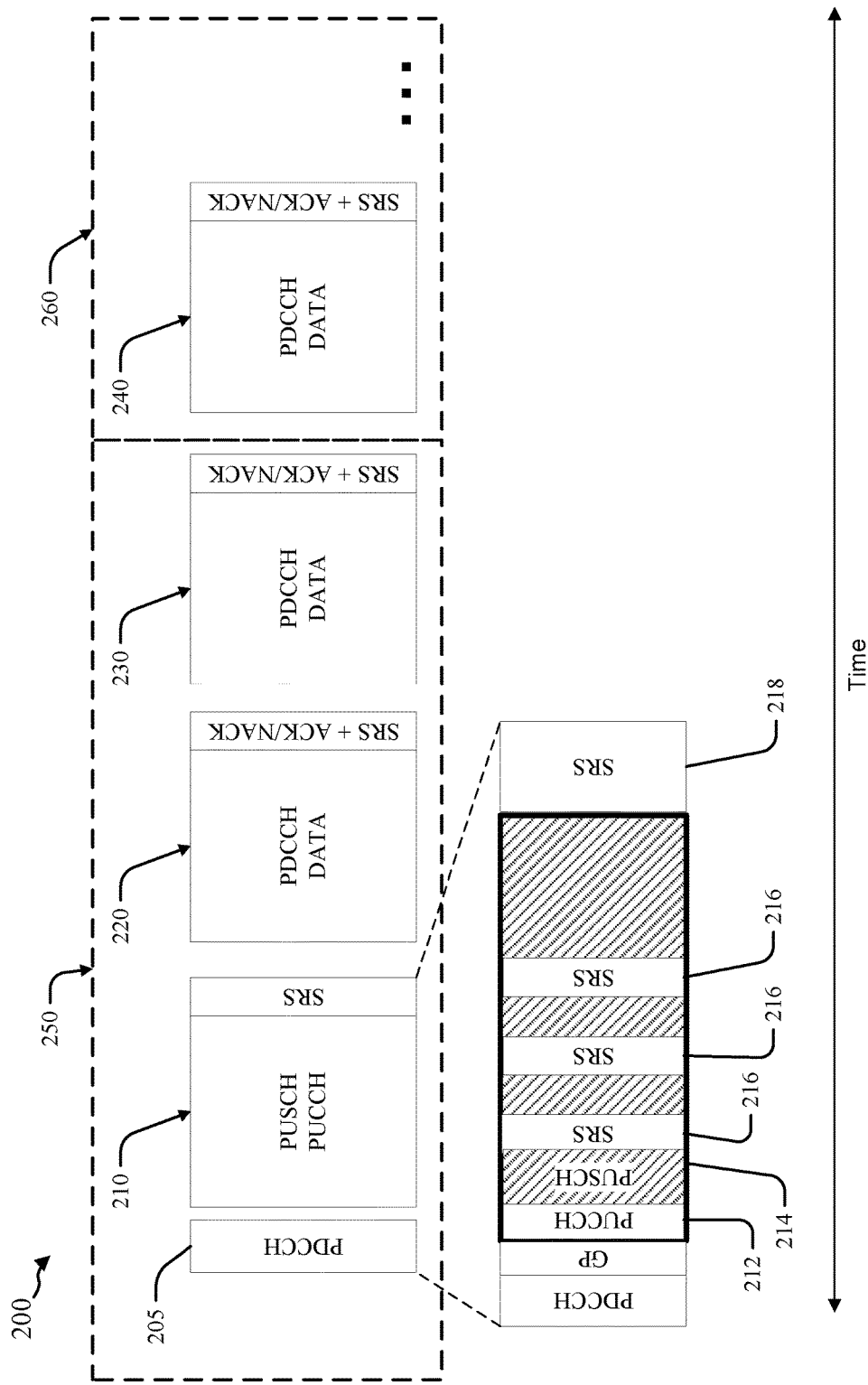
FIG. 2 is an example frame structure utilizing time-division duplexing.

FIG. 2 is an example frame structure 200 utilizing time-division duplexing. The frame structure 200 may be used for a burst of traffic in one or both of the uplink or downlink. The frame structure 200 may include an initial control slot 205, which may carry a physical dedicated control channel (PDCCH) 205 that provides initial control information for the frame structure 200. In some examples, the slot 205 may be broadcasted by the base station 105 to one or more UEs 110 within its cell.

The frame structure 200 may further include slots 210, 220, 230, and 240. Each of the slots 210, 220, 230, 240, may be subdivided into a plurality of resource blocks (e.g., OFDM or SC-FDM symbols) corresponding to frequency and time domain according to a numerology. As used herein, the term "numerology" may refer to a relation of subcarrier spacing in the frequency domain and a symbol period in the time domain. In an aspect, a mini-slot may refer to a unit of time corresponding to one or more symbol periods. A UE may be scheduled to communicate during a mini-slot within a slot. A numerology may be used for OFDM and/or SC-FDM. As discussed in further detail below, the numerology may be scalable.

Each of the slots may be designated as a downlink centric or uplink centric slot. For example, slot 210 may be an uplink centric slot 210 carrying a physical uplink control channel (PUCCH) for carrying control information and a physical uplink shared channel (PUSCH) for carrying data. Slot 220 may be an example of a downlink centric slot carrying the PDCCH and data (e.g., on a physical downlink shared channel (PDSCH)). The downlink centric slot 220 may be used primarily for downlink traffic, but may also include an opportunity for the UE 110 to transmit a sounding reference signal (SRS) and an ACK/NACK in the uplink. In an aspect, the ACK/NACK may be indicated by a selection of the SRS. Each of the slots 210, 220, 230, 240 may be followed by a guard period separating the subsequent slot from the preceding slot.

In an aspect, slot 210 may be an example of a warm-up slot. The slot 210 may include a physical uplink control channel (PUCCH) 212 followed by a physical uplink shared channel (PUSCH) 214. The PUSCH 214 may be interspersed with additional sounding reference signals (SRS) 216. The additional SRS 216 may be used to build a channel estimation filter at the base station. The slot 210 may end with a main SRS 218, which may be included in every slot regardless of whether the slot is indicated as a warm-up slot.

In an aspect, the slots 205, 210, 220, and 230 may be considered transition slots 250. The UE 110 may operate in a transition state when receiving and transmitting the transmission slots. The transmission properties of the transition slots 250 may be adapted between slots. In contrast, the slot 240 and any further slots in the slot burst may be considered subsequent slots 260. The transmission properties of the subsequent slots 260 may be fixed. That is, certain transmission properties may be adapted during the transition state, but become fixed once the UE 110 leaves the transition state.

Figure 3:
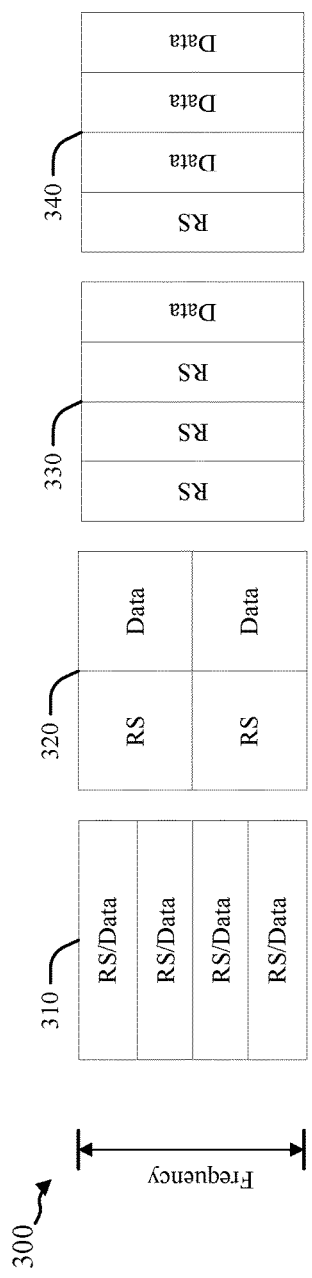
FIG. 3 is a conceptual diagram showing an example of scaled numerology.

FIG. 3 is a conceptual diagram showing an example of scaled numerology for adaptive resource management. A frequency-division numerology may be utilized in an OFDMA system or a SC-FDMA system. In an aspect, in 5G or NR, both OFDMA and SC-FDMA may be utilized for uplink traffic depending on the scenario. For example, OFDMA may be used for UEs that are located relatively close to the base station and SC-FDMA may be used for UEs near a cell edge. SC-FDMA may also be utilized for energy efficiency. The frequency-division numerology defines a subcarrier spacing in the frequency domain and a symbol period in the time domain that divide the available resources into resource elements (RE). The frequency-domain numerology may be identified by the subcarrier spacing. The resource elements may be further grouped into resource blocks (RB).

Scaling a numerology means that the ratio of the scaled subcarrier spacing to a nominal subcarrier spacing equals the ratio of any two positive integers. For example, scaling a numerology may include changing the subcarrier spacing by a power of 2 such that the ratio is $½^k$ or $2^k$, where k is a positive integer. A nominal subcarrier spacing may refer to a lowest subcarrier spacing allowed for a particular radio access technology (RAT). For example, a nominal subcarrier spacing may be a subcarrier spacing for a legacy RAT such as 4G/LTE. As another example, a nominal subcarrier spacing may be an agreed nominal subcarrier spacing and maybe indicated as $f_0$. A nominal subcarrier spacing may also be referred to as a base subcarrier spacing. When the subcarrier spacing is doubled, the symbol period is halved. For example, a nominal subcarrier spacing may be 15 kilohertz (KHz) ($f_0$) and scaled numerologies may have a subcarrier spacing of 30 KHz ($2 \times f_0$), 60 KHz ($4 \times f_0$), or 120 Khz ($8 \times f_0$). Such scaled numerologies may be compatible with the nominal subcarrier spacing because a time period (e.g., a time slot or subframe) may be evenly divided into a greater number of symbols. In an aspect, a scaled numerology may be utilized to provide a finer degree of control over allocation of resources in one or more slots.

As illustrated in FIG. 3, a nominal numerology 310 having a nominal subcarrier spacing may include a single symbol for a time period 350. The single symbol may be used to carry either a reference signal (RS) or data. The single symbol may be repeated on multiple subcarriers. In OFDMA, the symbol may be interleaved with one or more other symbols on the subcarriers. In an aspect, scalable numerology may be used to split differently the time-domain resource (e.g., symbols) in transition slots and subsequent slots. For example, a numerology 320 having double the subcarrier spacing has half of the symbol period. Accordingly two symbols may be transmitted in the time period 350. In an aspect, the symbols may be allocated between reference signals and data. For example, one symbol may be allocated to an RS and the other symbol to data, providing a 1:1 ratio between RS and data. Further scaling the numerology to 4 times the subcarrier spacing provides 4 symbols within the time period 350. Different ratios of RS to data may be achieved with the scaled numerology. For example, scaled numerology 330 allocates three symbols to RS and one symbol to data for a ratio of 3:1. In contrast, scaled numerology 330 allocates one (1) symbol to RS and three symbols to data for a ratio of 1:3. In an aspect, when the UE 110 transmits multiple consecutive RS, each symbol may be the same. Accordingly, a cyclic prefix (CP) may be unnecessary for a sequence of consecutive identical RS symbols because one of the other RS symbols may be used as a CP for any of the identical RS symbols.

As discussed above, when the UE 110 is in a transition state, it may be desirable to provide more RS to help with both decoding of transmitted data as well as building of a channel estimation filter. The additional RS, however, becomes a less efficient use of resources as the channel estimation filter is built. In an aspect, the adaptation component 170 may adjust the scaled numerology for a portion of a slot. Such that the allocation of RS and data symbols can be adjusted. The adaptation component may also adjust the allocation of RS and data symbols (e.g., by changing a ratio).

Figure 4:
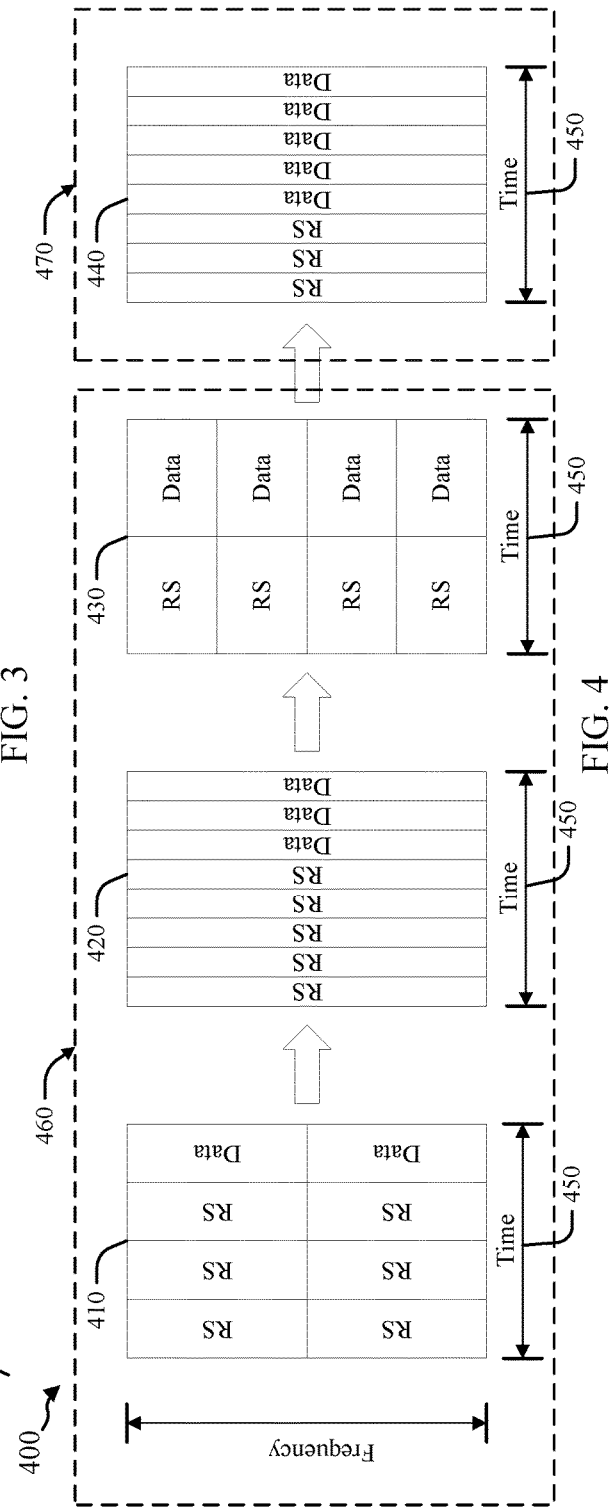
FIG. 4 is a conceptual diagram showing an example of adaptation of reference signals between slots using a scaled numerology.

FIG. 4 illustrates a conceptual diagram showing an example of adaptation of reference signals between slots using a scaled numerology. Each of slots 410, 420, 430, and 440 may have a different ratio of RS symbols to data symbols. The scaled numerology may be adapted as the transmitted slot transitions from slot 410, to slot 420, to slot 430, to slot 440. In an aspect, the slot 440 may be a slot subsequent to the transition state and the ratio of RS symbols to data symbols used in slot 440 may be used for all slots subsequent to the transition state in the slot burst. In an aspect, the slot 410 may be a first slot in a burst and may be considered a transition slot. In the first slot 410, the numerology may be scaled such that four (4) symbols may be transmitted within a time period 450, which may, for example, correspond to a slot. For example, a nominal subcarrier spacing of N (e.g. 15 KHz) may be scaled by a factor of 4, which is a power of 2, to have a subcarrier spacing of 4N. The time-domain resources may be allocated such that three (3) symbols are allocated to RS and one (1) symbol is allocated to data, giving a ratio of 3:1 of 75% RS. The relatively high ratio of RS may improve decoding of the data when a channel estimation filter is not available.

In the second slot 420, the numerology may be further scaled. For example, the nominal subcarrier spacing of N may be scaled by a factor of 8, which is a power of 2, resulting in a subcarrier spacing of 8N and 8 symbols within the time period 450. The resources may be allocated such that five (5) symbols are allocated to RS and three (3) symbols are allocated to data. Accordingly, the ratio of RS to data may be 5:3 or 62.5% RS. It may be noted that such a ratio is unavailable with the numerology of slot 410 (at least in SC-FDM). Accordingly, by changing the numerology, a gradual reduction in the ratio may be achieved.

In slot 430, the numerology may be scaled by a different factor. For example, the nominal subcarrier spacing of N may be scaled by a factor of 2, resulting in a subcarrier spacing of 2N and 2 symbols in the time period 450. One symbol may be allocated for RS and one symbol may be allocated for data for a ratio of 1:1 or 50% RS. In this example, the scaling is reduced because the lower numerology allows for the desired ratio. In an aspect, a lower numerology or lower slot spacing may be desirable because the lower slot spacing may be more robust to delay spread and/or inter-symbol interference.

The slots 410, 420, 430 may be considered part of the transition state and may a transition slot 460. Slot 440 may be considered one of the subsequent slots 470. Slot 440 may be immediately subsequent to the transition slots 460. In an aspect, slot 440 may be followed by additional subsequent slots 470. In slot 440, the numerology may return to the nominal subcarrier spacing of N being scaled by a factor of 8, resulting in a subcarrier spacing of 8N and 8 symbols within the time period 450. Three (3) symbols may be allocated for RS and five (5) symbols may be allocated for data for a ratio of 3:5 or 37.5% RS. The relatively low ratio may allow an increase in the amount of data that may be transmitted in the subsequent slots. The ratio in slot 440 may be used for each slot within the slot burst that is subsequent to the transition state.

Figures 5, 6:
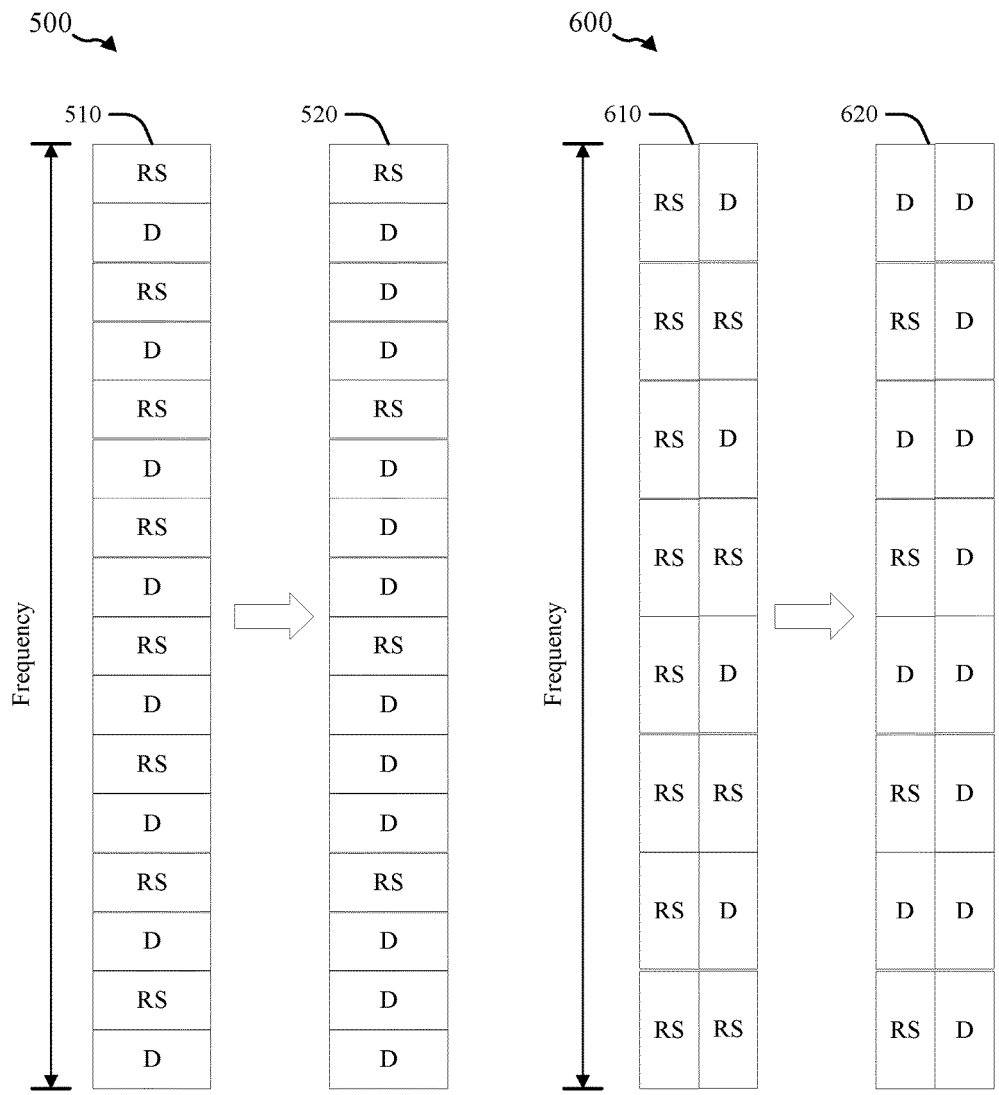
FIG. 5 is a conceptual diagram showing adaptation of tone allocation.
FIG. 6 is a conceptual diagram illustrating adaptation of tone allocation and symbol allocation using scaled numerology.

FIG. 5 is a conceptual diagram 500 showing adaptation of tone allocation. Adaptation of tone allocation may be utilized in OFDM transmissions. In a first slot 510, RS tones are interleaved with data tones such that alternating tones are RS tones. Accordingly, the ratio of RS tones to data tones is 1:1 or 50% RS. The first slot 510 may be the first slot in a burst and may be considered a transition slot. In a subsequent slot 520, the tone allocation may be changed to decrease the frequency density of the RS tones such that RS tones are interleaved at every fourth tone. Accordingly, in slot 520, the ratio of RS tones to data tones is 1:3 or 25% RS. The higher ratio of RS tones in the transition slot 510 may provide additional reference signals to help decode data. The lower ratio of RS tones in the subsequent slot 520 may allow more data to be transmitted in the subsequent slot 520.

FIG. 6 is a conceptual diagram 600 illustrating adaptation of tone allocation and symbol allocation using scaled numerology. In the slots 610 and 620, the numerology may be scaled in comparison to slots 510 and 520 such that two symbols may be transmitted in each slot. In the first slot, every tone of the first symbol may be allocated as an RS tone and in the second symbol, RS tones may be interleaved with data tones. Accordingly, the total ratio of RS tones to data tones for the slot 610 is 3:1 or 75% RS. The first slot 610 may be the first slot in a burst and may be considered a transition slot. In the subsequent slot 620, the tone allocation may be changed such that in the first symbol, RS tones are interleaved with data tones and in the second symbol all of the tones are data tones. Accordingly, in slot 620, the ratio of RS tones to data tones is 3:1 or 75% RS. The higher ratio of RS tones in the transition slot 610 may provide additional reference signals to help decode data. The lower ratio of RS tones in the subsequent slot 620 may allow more data to be transmitted in the subsequent slot 620. Where a combination of both time and frequency adaptation is possible a desired ratio may be achieved while providing robustness against delay spread and frequency shifts.

Figure 7:
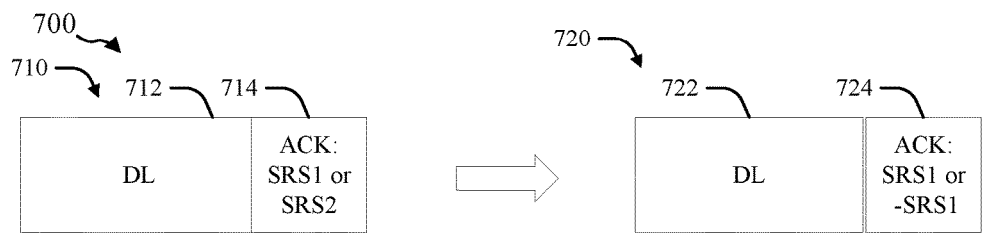
FIG. 7 is a conceptual diagram showing adaptation of a waveform of a reference signal.

FIG. 7 is a conceptual diagram 700 showing adaptation of a waveform of a reference signal. A first slot 710 may be an example of a downlink centric slot having a downlink portion 712 and an ACK portion 714. The ACK portion 714 may be used to provide an indication of whether downlink portion 712 was correctly received. In an aspect, the ACK portion 714 may include an SRS. The selection of the SRS waveform may indicate ACK or NACK. In the slot 710, an ACK may be indicated by a first SRS1 and a NACK may be indicated by a second, SRS2 having a sequence that is orthogonal to SRS1. In an aspect, SRS1 being orthogonal to SRS2 may allow the ACK/NACK to be decoded using noncoherent communication. As used herein, noncoherent communication may refer to communications where the receiver does not know the phase of every subcarrier. For example, the receiver may not have built an effective channel estimate filter or phase estimate because the slot 710 is a transition slot. Because SRS1 and SRS2 are orthogonal, the difference should be reliably detected, for example, by a metric such as received energy.

Slot 720 may also be an example of a downlink centric slot including a downlink portion 722 and an ACK/NACK portion 724. Once again, the ACK portion 724 may be used to provide an indication of whether downlink portion 712 was correctly received using the selection of the SRS waveform. In slot 720, the reliability of the communication may be improved by using coherent communication. In the subsequent slot 720, the receiver may have built a coherent filter, for example, based on the SRS in the ACK portion 714 and/or other reference signals. The ACK portion 724 may indicate an ACK using a first SRS (e.g., SRS1) and indicate a NACK using a sequence that is the opposite of the first SRS (e.g., −SRS1). Because the phase of each of the subcarriers is known, the receiver may more reliably decode which SRS symbol was transmitted in comparison to a noncoherent communication.

Figure 8:
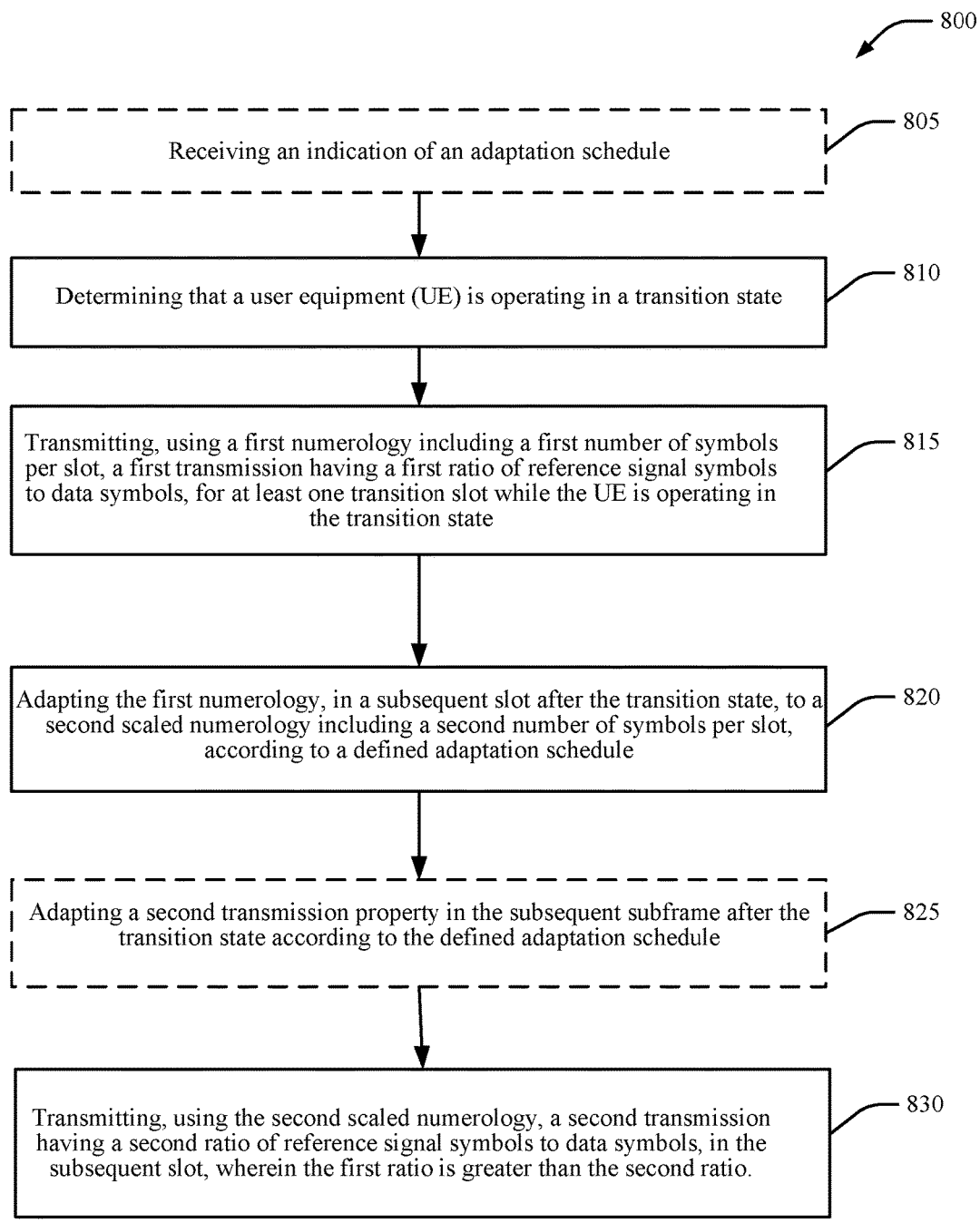
FIG. 8 is a flowchart of an example method of one technique for adaptation of transmission resources in wireless communication.

FIG. 8 is a flowchart of an example method 800 of resource adaptation for wireless communications. The method 800 may be performed using an apparatus (e.g., the UE 110 or a base station 105, for example). Although the method 800 is described below with respect to the elements of the UE 110, other components may be used to implement one or more of the steps described herein.

In block 805, the method 800 may optionally include receiving an indication of an adaptation schedule. In an aspect, the transition component 160 may receive the indication of the adaptation schedule. For example, the indication may be broadcast by a base station in a system information block (SIB) or transmitted to the UE 110 in signaling information such as a PDCCH or higher level signaling. The adaptation schedule may be defined by a standard or specification that is followed by the UE 110 and the base station 105. The adaptation schedule may be defined by one or more parameters that may be signaled during operation. For example, the standard may define multiple adaptation schedules and a base station may signal an indication of which adaptation schedule is to be applied by the UE 110. In another aspect, an adaptation schedule may include a time period (e.g., a number of slots) that define when adaptation is to occur. The base station 105 may signal additional parameters that define the adaptation to be applied by the UE 110. Accordingly, both the UE 110 and the base station 105 may have access to the adaptation schedule and may implement the adaptations at the same time.

In block 810, the method 800 may include determining that a UE is operating in a transition state. In an aspect, for example, the detection component 165 may determine that the UE 110 is operating in a transition state. The UE 110 may operate in the transition state at the start of a transmission burst. For example, the detection component 165 may determine that the UE has transitioned to a connected mode (e.g. established a connection with the base station 105). As another example, the detection component 165 may determine that the UE 110 has transitioned from a discontinuous reception (DRX) state. As another example, the detection component 165 may determine that the UE 110 is experiencing changing channel conditions (e.g., by analyzing channel metrics). As another example, the detection component 165 may determine that a channel estimation filter is unreliable (e.g., by evaluating the sources for or performance of the channel estimation filter). The detection component 165 may request the transition state from the base station 105 in response to experiencing changing channel conditions or determining that a channel estimation filter is unreliable. The base station 105 may also determine that the UE is operating in a transition state. The base station 105 may determine when the UE transitions to the connected mode or transitions from the DRX state. Additionally, the base station 105 may signal the UE 110 to enter the transition state based on conditions detected by the base station 105. Further details regarding determining that a UE is operating in a transition state are described below with respect to FIG. 9.

In block 815, the method 800 may include transmitting using a first numerology including a first number of symbols per slot, a first transmission having a first ratio of reference signal symbols to data symbols, for at least one transition slot while the UE is operating in the transition state. In an aspect, the transmission component 175 at either the UE 110 or base station 105 may transmit, using the first numerology including the first number of symbols per slot, the first transmission having the first ratio of reference signal symbols to data symbols, for the at least one transition slot while the UE is operating in the transition state. For example, the transmission component 175 at the UE 110 may transmit the first transmission, and the base station 105 may receive the first transmission according to the first numerology. Conversely, the transmission component 175 at the base station 105 may transmit the first transmission, and the UE 110 may receive the first transmission according to the first numerology. Accordingly, the first transmission may be between the UE 110 and the base station 105 in either the uplink direction or the downlink direction. The first numerology may be determined by the numerology component 174 based on the transition state and the adaptation schedule. Generally, the first numerology may favor usage of resources for pilot signals and channel estimation. For example, the first numerology may allow a relative increase in the ratio of reference symbols to data symbols during the transition state as compared to during subsequent slots.

In block 820, the method 800 may include adapting the first numerology, in a subsequent slot after the transition state, to a second scaled numerology including a second number of symbols per slot, according to a defined adaptation schedule. In an aspect, for example, the numerology component 174 may adapt the first numerology, in the subsequent slot after the transition state, to the second scaled numerology including the second number of symbols per slot according to the defined adaptation schedule. The adaptation schedule may be the adaptation schedule indicated in block 805. By changing the number of symbols per slot, the adaptation component 170 may achieve a desired ratio of RS symbols to data symbols. For example, using the scaled numerology, the adaptation component 170 may change an allocation of RS symbols and data symbols in the time domain.

In block 825, the method 800 may optionally include adapting a second transmission property in the subsequent slot after the transition state according to the defined adaptation schedule. In an aspect, for example, the adaptation component 170 may adapt the second transmission property in the subsequent slot after the transition state according to the defined adaptation schedule. The adaptation to a second transmission property may be in addition to the adaptation to the numerology, which may be considered a first transmission property. The adaptation of the second transmission property may include reducing a transmission power in the subsequent slot according to a predetermined schedule. The reduction may be applied to a base transmission power. Further details regarding controlling the transmission power in the subsequent slot are described below with respect to FIG. 10. As another example, the adaptation of the second transmission property may include changing an allocation of tones in the frequency domain. In yet another example, the adaptation of the second transmission property may include the adaptation component 170 changing a symbol waveform mapping such that a different symbol waveform is used to indicate the same data (e.g., ACK or NACK) in the subsequent slot.

In block 830, the method 800 may include transmitting, using the second scaled numerology, a second transmission having a second ratio of reference signal symbols to data symbols, in the subsequent slot, wherein the first ratio is greater than the second ratio. In an aspect, for example, the transmission component 175 at either the UE 110 or the base station 105 may transmit, using the second scaled numerology, the second transmission in the subsequent slot. For example, the transmission component 175 at the UE 110 may transmit the second transmission, and the base station 105 may receive the second transmission according to the second numerology. Conversely, the transmission component 175 at the base station 105 may transmit the second transmission, and the UE 110 may receive the second transmission according to the first numerology. Accordingly, the second transmission may be between the UE 110 and the base station 105 in either the uplink direction or the downlink direction. Further, the block 830 may be performed by the same device (UE 110 or base station 105) that performs the block 810. Accordingly, the second transmission may be in the same direction as the first transmission. In an aspect, the transmission component 175 may use the second numerology and the second ratio selected in block 820. The transmission component 175 may also use any second transmission property selected in block 825.

Figure 9:
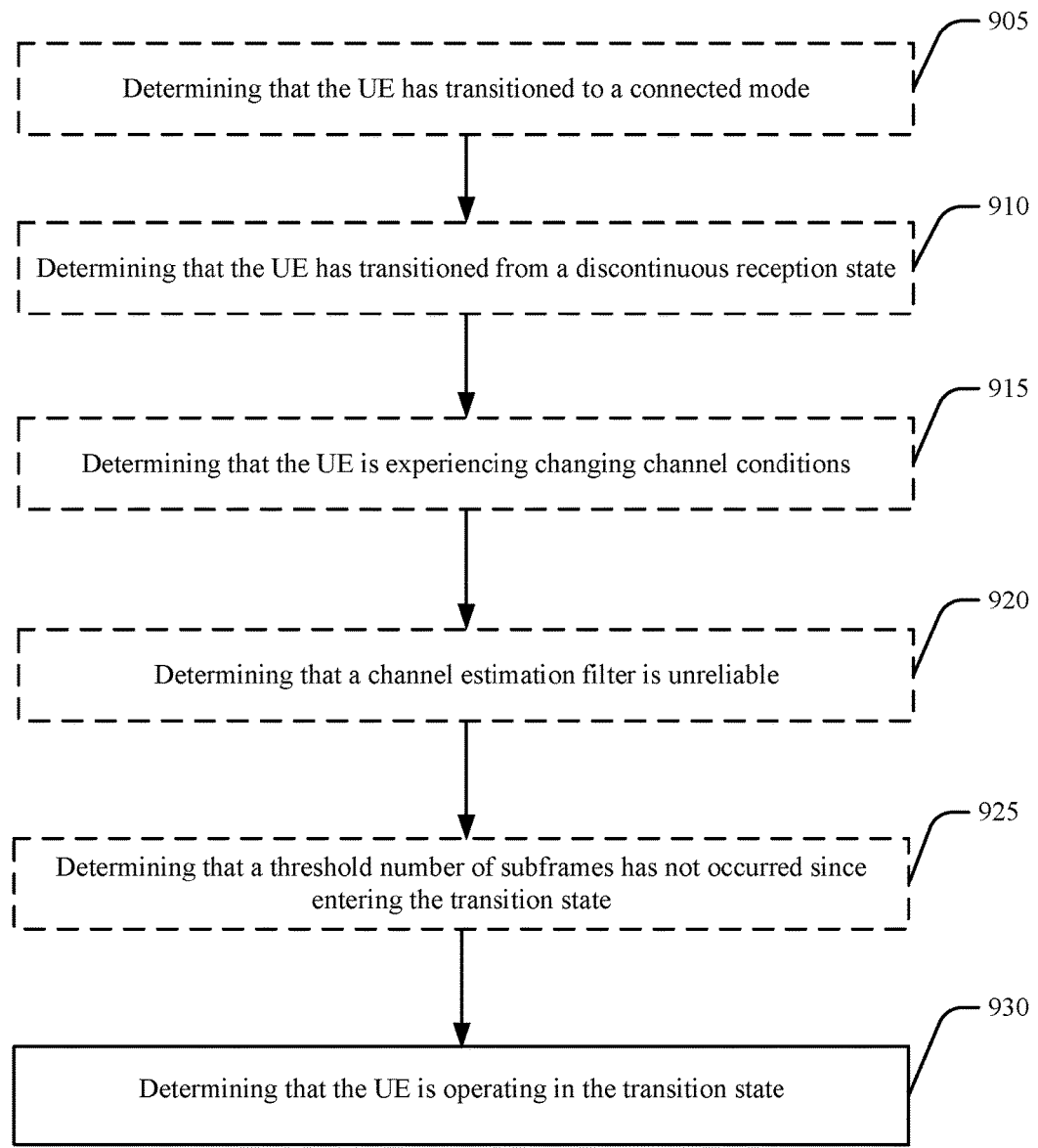
FIG. 9 is a flowchart of an example method of one technique for determining whether a UE is operating in a transition state.

FIG. 9 is a flowchart of an example method 900 of determining whether a UE is operating in a transition state. In an aspect, the method 900 may be an example of an implementation of the block 810 in FIG. 8. The method 900 may be performed using an apparatus (e.g., the UE 110 or a base station 105, for example). Although the method 900 is described below with respect to the elements of the UE 110, other components may be used to implement one or more of the steps described herein.

In block 905, the method 900 may optionally include determining that the UE has transitioned to a connected mode. In an aspect, for example, the detection component 165 may determine that the UE has transitioned to a connected mode. For example, the detection component 165 may detect a transition to connected mode performed by a modem of the UE 110. In another aspect, a detection component 165 at a base station 105 may monitor for signaling from a UE indicating the UE has transitioned to a connected mode. For example, the signaling may include a command from the base station 105 for the UE 110 to enter the connected mode or a request from the UE 110 to transmit data.

In block 910, the method 900 may optionally include determining that the UE has transitioned from a discontinuous reception (DRX) state. In an aspect, for example, the detection component 165 may determine that the UE has transitioned from the DRX state. For example, the detection component 165 may determine when the UE transitions from the DRX state based on a DRX cycle of the UE 110.

In block 915, the method 900 may optionally include determining that the UE is experiencing changing channel conditions. In an aspect, for example, the detection component 165 may determine that the UE is experiencing changing channel conditions. For example, the detection component 165 may analyze a channel quality indicator (CQI) transmitted by the UE 110 to determine whether the channel conditions are changing. For example, the detection component 165 may determine whether a change in CQI satisfies a threshold. In another aspect, a detection component 165 at the base station 105 may determine whether the channel conditions are changing based on reference signals transmitted by the UE 110.

In block 920, the method 900 may optionally include determining that a channel estimation filter is unreliable. In an aspect, for example, the detection component 165 may determine whether the channel estimation filter 180 is unreliable. For example, the detection component 165 may determine that time period since the last update to the channel estimation filter satisfies a threshold.

In block 925, the method 900 may optionally include determining that a threshold number of slots has not occurred since entering the transition state. In an aspect, for example, the detection component 165 may determine that the threshold number of slots has not occurred since entering the transition state. For example, the detection component 165 may determine a slot when the UE 110 enters the transition state. The detection component 165 may then determine when the UE 110 leaves the transition state based on the defined adaptation schedule. For example, the adaptation schedule may define a fixed number of slots in the transition state.

In block 930, the method 900 may include determining that the UE is operating in the transition state. In an aspect, for example, the detection component 165 may determine that the UE is operating in the transition state based on one or more of the blocks 805, 810, 815, 820, or 825. For example, the detection component 165 may determine that the UE 110 is operating in the transition state when at least one of blocks 805, 810, 815, 820, or 825 occurs for a slot.

Figure 10:
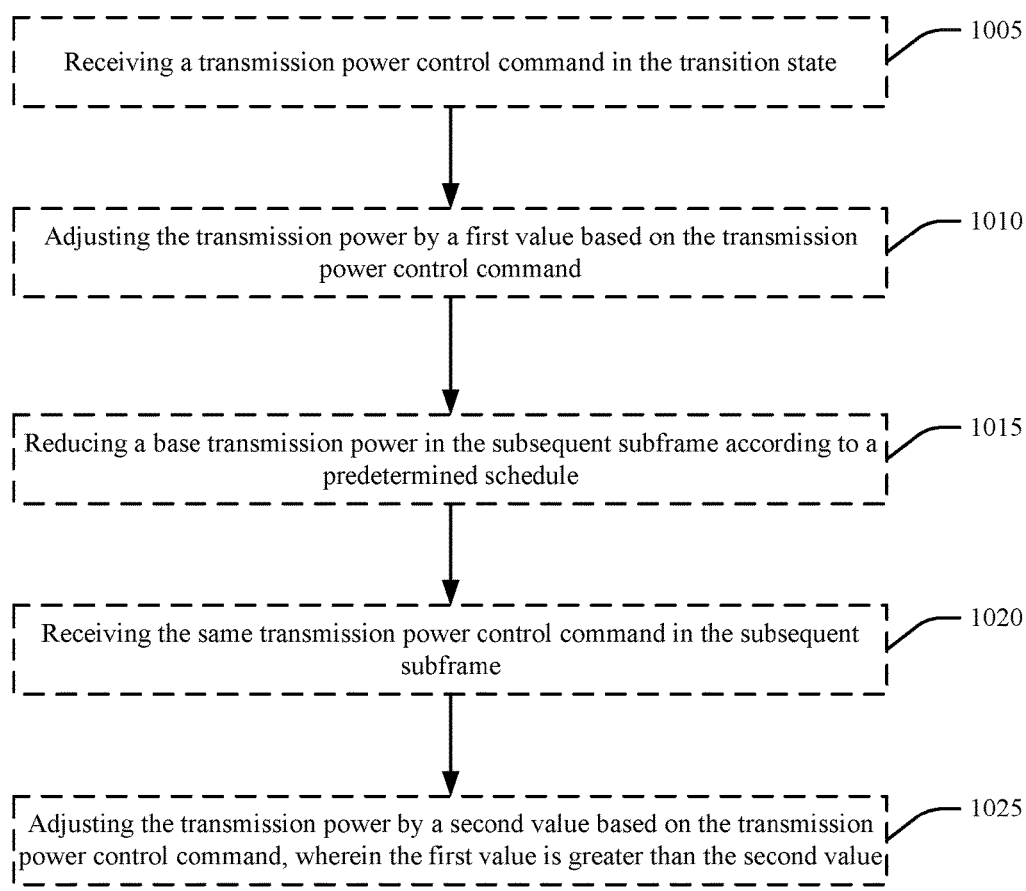
FIG. 10 is a flowchart of an example method of one technique for adapting a transmission power.

FIG. 10 is a flowchart of an example method 1000 of adapting a transmission power. In an aspect, the method 1000 may be an example of an implementation of the block 825 in FIG. 8. The method 1000 may be performed using an apparatus (e.g., the UE 110). Although the method 1000 is described below with respect to the elements of the UE 110, other components may be used to implement one or more of the steps described herein.

In block 1005, the method 1000 may optionally include receiving a transmission power control command in the transition state. In an aspect, for example, the power component 172 may receive the transmission power control command while the UE 110 is in the transition state. The transmission power control command may be transmitted by the base station 105.

In block 1010, the method 1000 may optionally include adjusting the transmission power by a first value based on the transmission power control command. In an aspect, for example, the power component 172 may adjust the transmission power of the UE 110 by a first value based on the transmission power control command. The first value may be a value for use in the transition state that allows the power component 172 to quickly adjust the transmission power of the UE 110. For example, the first value may be defined by a standard, configured for an individual UE via physical layer signaling (e.g., the PDCCH) or higher layer signaling (e.g., radio resource control), or broadcast by the base station (e.g., in SIBs). The first transmission power may be a multiple of a normal transmission power step size of the UE when operating outside of the transition state.

In block 1015, the method 1000 may optionally include reducing a base transmission power in the subsequent slot according to a predetermined schedule. In an aspect, for example, the power component 172 may reduce a base transmission power in the subsequent slot according to a predetermined schedule. For example, the power component 172 may reduce the base transmission power by a fixed amount when leaving the transition state.

In block 1020, the method 1000 may optionally include receiving the same transmission power control command in the subsequent slot. In an aspect, for example, the power component 172 may receive the same transmission power control command in the subsequent slot. For example, if an UP command is received during the transition state, the same UP command may be received in the subsequent slot. Similarly, if a DOWN command is received during the transition state, the same DOWN command may be received in a subsequent slot. That is, the signaling of transmit power control commands may be the same in the transition state and in the subsequent slot.

In block 1025, the method 1000 may optionally include adjusting the transmission power by a second value based on the same transmission power control command, wherein the first value is greater than the second value. In an aspect, for example, the power component 172 may adjust the transmission power by the second value based on the same transmission power control command. Because the first value is greater than the second value, the power component 172 may adjust the transmission power to a lesser extend during the subsequent slot than in the transition state even though the same transmission power command is received. For example, if the transmission power is adjusted by 3 dB during the transition state, the transmission power may be adjusted by 1 dB during the subsequent slot. Applying the smaller second value may allow the power component 172 to have finer control over the transmission power during the subsequent slots.

Figure 11:
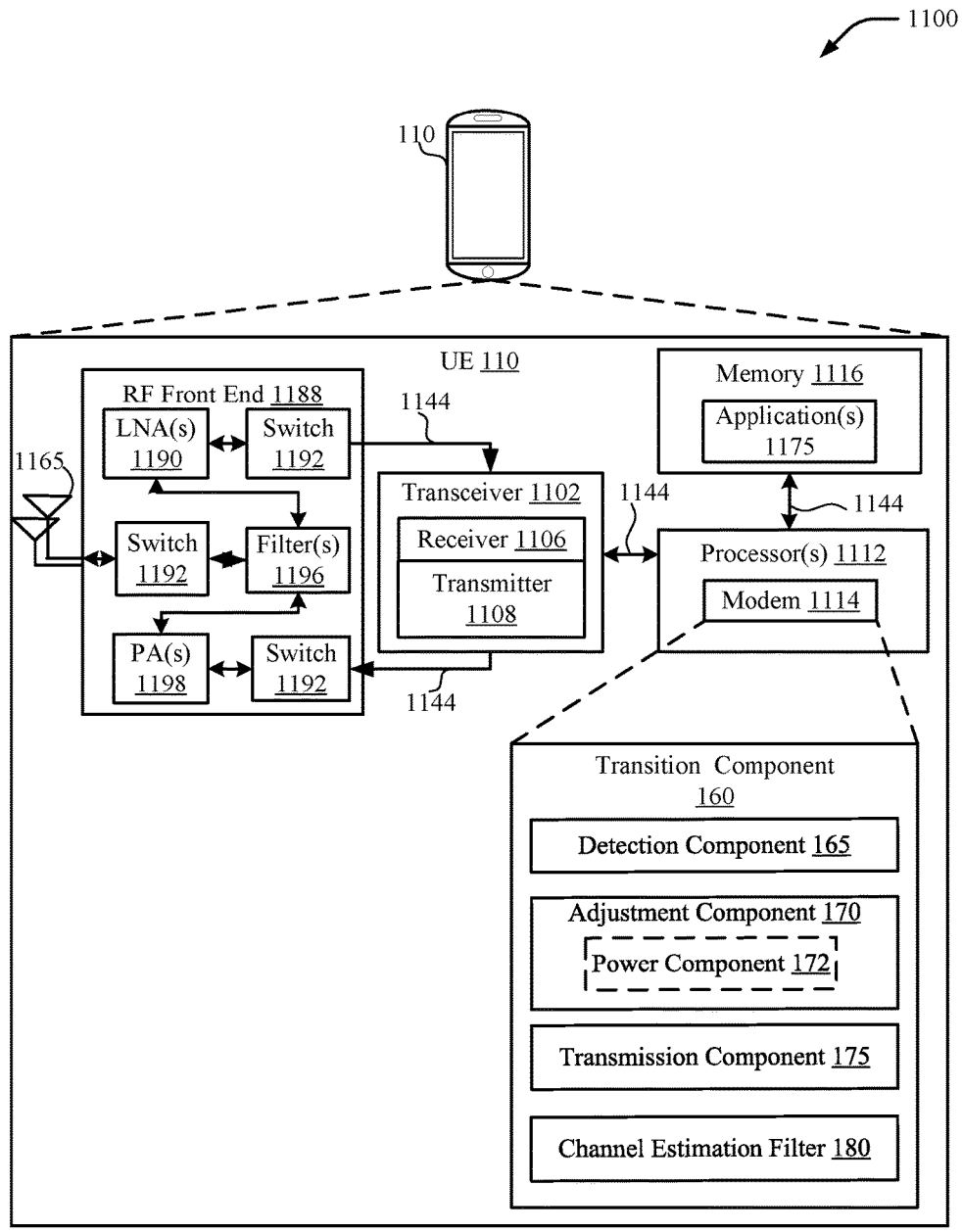
FIG. 11 is a schematic diagram of an aspect of an implementation of various components of the UE configured for communicating with the base station, in accordance with various aspects of the present disclosure.

FIG. 11 schematically illustrates hardware components and subcomponents of the UE 110 for implementing one or more methods (e.g., methods 800, 900, 1000) described herein in accordance with various aspects of the present disclosure. For example, one example of an implementation of UE 110 may include a variety of components, some of which have already been described above, but including components such as one or more processors 1112 and memory 1116 and transceiver 1102 in communication via one or more buses 1144, which may operate in conjunction with the transition component 160 to enable one or more of the functions described herein related to including one or more methods of the present disclosure. Further, the one or more processors 1112, modem 1114, memory 1116, transceiver 1102, RF front end 1188 and one or more antennas 1165, may be configured to support voice and/or data calls (simultaneously or non-simultaneously) in one or more radio access technologies.

In an aspect, the one or more processors 1112 can include a modem 1114 that uses one or more modem processors. The various functions related to transition component 160 may be included in modem 1114 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with transceiver 1102. In other aspects, some of the features of the one or more processors 1112 and/or modem 1114 associated with transition component 160 may be performed by transceiver 1102.

Also, memory 1116 may be configured to store data used herein and/or local versions of applications or transition component 160 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining transition component 160 and/or one or more of its subcomponents, and/or data associated therewith, when UE 110 is operating at least one processor 1112 to execute UE transition component 160 and/or one or more of its subcomponents.

Transceiver 1102 may include at least one receiver 1106 and at least one transmitter 1108. Receiver 1106 may include hardware, firmware, and/or software code executable by a processor for receiving data, the code comprising instructions and being stored in a memory (e.g., computer-readable medium). Receiver 1106 may be, for example, a radio frequency (RF) receiver. In an aspect, receiver 1106 may receive signals transmitted by at least one base station 105. Additionally, receiver 1106 may process such received signals, and also may obtain measurements of the signals, such as, but not limited to, Ec/Io, SNR, RSRP, RSSI, etc. Transmitter 1108 may include hardware, firmware, and/or software code executable by a processor for transmitting data, the code comprising instructions and being stored in a memory (e.g., computer-readable medium). A suitable example of transmitter 1108 may including, but is not limited to, an RF transmitter.

Moreover, in an aspect, UE 110 may include RF front end 1188, which may operate in communication with one or more antennas 1165 and transceiver 1102 for receiving and transmitting radio transmissions, for example, wireless communications transmitted by at least one base station 105 or wireless transmissions transmitted by UE 110. RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by RF front end 1188 to amplify a signal for an RF output at a desired output power level. In an aspect, each PA 1198 may have specified minimum and maximum gain values. In an aspect, RF front end 1188 may use one or more switches 1192 to select a particular PA 1198 and its specified gain value based on a desired gain value for a particular application.

Also, for example, one or more filters 1196 can be used by RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, RF front end 1188 can use one or more switches 1192 to select a transmit or receive path using a specified filter 1196, LNA 1190, and/or PA 1198, based on a configuration as specified by transceiver 1102 and/or processor 1112. In an aspect, during subsequent slots after the transition state, the channel estimation filter 180 may be used as one of the filters 1196 or may be used to determine which of the filters 1196 is selected.

As such, transceiver 1102 may be configured to transmit and receive wireless signals through one or more antennas 1165 via RF front end 1188. In an aspect, transceiver may be tuned to operate at specified frequencies such that UE 110 can communicate with, for example, one or more base stations 105 or one or more cells associated with one or more base stations 105. In an aspect, for example, modem 1114 can configure transceiver 1102 to operate at a specified frequency and power level based on the UE configuration of the UE 110 and the communication protocol used by modem 1114.

In an aspect, modem 1114 can be a multiband-multimode modem, which can process digital data and communicate with transceiver 1102 such that the digital data is sent and received using transceiver 1102. In an aspect, modem 1114 can be multiband and be configured to support multiple frequency bands for a specific communications protocol. In an aspect, modem 1114 can be multimode and be configured to support multiple operating networks and communications protocols. In an aspect, modem 1114 can control one or more components of UE 110 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Although FIG. 11 illustrates hardware components and subcomponents of the UE 110, the base station 105 may include similar components for implementing one or more methods (e.g., methods 800, 900, 1000) described herein in accordance with various aspects of the present disclosure.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of resource adaptation for wireless communications using a bursty transmission pattern, comprising:
   determining, by a processor, that a user equipment (UE) is operating in a transition state;
   transmitting, using a first numerology including a first number of symbols per slot, a first radio-frequency transmission having a first ratio of reference signal symbols to data symbols, for at least one transition slot while the UE is operating in the transition state;
   adapting, by the processor, the first numerology, in a subsequent slot after the transition state, to a second scaled numerology including a second number of symbols per slot, according to a defined adaptation schedule defining a fixed number of slots in the transition state;
   adjusting a waveform of a symbol transmitted in the at least one transition slot to a different waveform in the subsequent slot, wherein in the at least one transition slot, the symbol carries a first sequence or a second sequence orthogonal to the first sequence, and wherein in the subsequent slot the symbol carries the first sequence or the opposite of the first sequence; and
   transmitting, using the second scaled numerology, a second radio-frequency transmission having a second ratio of reference signal symbols to data symbols, in the subsequent slot, wherein the first ratio of reference signal symbols to data symbols is greater than the second ratio of reference signal symbols to data symbols.

2. The method of claim 1, further comprising:
   adapting, during the transition state, the first numerology to a third scaled numerology including a third number of symbols per slot; and
   transmitting, during the transition state, a third transmission having a third ratio of reference signal symbols to data symbols, wherein the third ratio is less than the first ratio and greater than the second ratio.

3. The method of claim 1, wherein the first transmission and the second transmission are between the UE and a serving base station.

4. The method of claim 1, further comprising reducing a base transmission power in the subsequent slot according to a predetermined schedule.

5. The method of claim 1, further comprising:
receiving a transmission power control command in the transition state;
adjusting a transmission power by a first value based on the transmission power control command;
receiving the same transmission power control command in the subsequent slot; and
adjusting the transmission power by a second value based on the transmission power control command, wherein the first value is greater than the second value.

6. The method of claim 1, wherein the first transmission and the second transmission are based on single carrier frequency division multiple access (SC-FDMA).

7. The method of claim 1, wherein the reference signal symbols are identical reference symbols transmitted consecutively and do not include a cyclic prefix.

8. The method of claim 1, wherein the waveform of the symbol in the at least one transition slot allows for noncoherent demodulation of the first transmission independent of a subcarrier phase, wherein the waveform of the symbol in the subsequent slot allows for coherent demodulation of the second transmission based on a subcarrier phase estimated based on the first transmission.

9. The method of claim 1, wherein the first transmission and the second transmission are based on orthogonal frequency division multiple access (OFDMA), wherein in the at least one transition slot a first ratio of reference resource elements to data resource elements is used, wherein in the subsequent slot a second ratio of reference resource elements to data resource elements is used, and wherein the first ratio is greater than the second ratio.

10. The method of claim 1, wherein determining that the UE is operating in the transition state includes determining that the UE has transitioned to a connected mode.

11. The method of claim 1, wherein determining that the UE is operating in the transition state includes determining that the UE has transitioned from a discontinuous reception mode.

12. The method of claim 1, wherein determining that the UE is operating in the transition state includes determining that the UE is experiencing changing channel conditions.

13. The method of claim 1, wherein determining that the UE is operating in the transition state includes determining that a channel estimation filter is unreliable.

14. An apparatus for resource adaptation in wireless communications using a bursty transmission pattern, comprising:
a processor;
a memory coupled to the processor, wherein the memory includes instructions executable by the processor to:
determine that a user equipment (UE) is operating in a transition state;
transmit, using a first numerology including a first number of symbols per slot, a first radio-frequency transmission having a first ratio of reference signal symbols to data symbols, for at least one transition slot while the UE is operating in the transition state;
adapt the first numerology, in a subsequent slot after the transition state, to a second scaled numerology including a second number of symbols per slot according to a defined adaptation schedule defining a fixed number of slots in the transition state;
adjust a waveform of a symbol transmitted in the at least one transition slot to a different waveform in the subsequent slot, wherein in the at least one transition slot, the symbol carries a first sequence or a second sequence orthogonal to the first sequence, and wherein in the subsequent slot the symbol carries the first sequence or the opposite of the first sequence; and
transmit, using the second scaled numerology, a second radio-frequency transmission having a second ratio of reference signal symbols to data symbols, in the subsequent slot, wherein the first ratio of reference signal symbols to data symbols is greater than the second ratio of reference signal symbols to data symbols.

15. The apparatus of claim 14, wherein the memory includes instructions executable by the processor to:
adapt, during the transition state, the first numerology to a third scaled numerology including a third number of symbols per slot; and
transmit, during the transition state, a third transmission having a third ratio of reference signal symbols to data symbols, wherein the third ratio is less than the first ratio and greater than the second ratio.

16. The apparatus of claim 14, wherein the apparatus is the UE, wherein the first transmission and the second transmission are from the UE to a serving base station.

17. The apparatus of claim 14, wherein the memory includes instructions executable by the processor to reduce a base transmission power in the subsequent slot according to a predetermined schedule.

18. The apparatus of claim 14, wherein the memory includes instructions executable by the processor to receive a transmission power control command in the transition state;
adjust a transmission power by a first value based on the transmission power control command;
receive the same transmission power control command in the subsequent slot; and
adjust the transmission power by a second value based on the transmission power control command, wherein the first value is greater than the second value.

19. The apparatus of claim 14, wherein the first transmission and the second transmission are based on single carrier frequency division multiple access (SC-FDMA).

20. The apparatus of claim 14, wherein the reference signal symbols are identical reference symbols transmitted consecutively and do not include a cyclic prefix.

21. The apparatus of claim 14, wherein the waveform of the symbol in the at least one transition slot allows for noncoherent demodulation of the first transmission independent of a subcarrier phase, wherein the waveform of the symbol in the subsequent slot allows for coherent demodulation of the second transmission based on a subcarrier phase estimated based on the first transmission.

22. The apparatus of claim 14, wherein the first transmission and the second transmission are based on orthogonal frequency division multiple access (OFDMA), wherein in the transition slot a first ratio of reference resource elements to data resource elements is used, wherein in the subsequent slot a second ratio of reference resource elements to data resource elements is used, and wherein the first ratio is greater than the second ratio.

23. The apparatus of claim 14, wherein the memory includes instructions executable by the processor to determine that the UE is operating in the transition state by determining that the UE has transitioned to a connected mode.

24. The apparatus of claim 14, wherein the memory includes instructions executable by the processor to determine that the UE is operating in the transition state by determining that the UE has transitioned from a discontinuous reception mode.

25. The apparatus of claim 14, wherein the memory includes instructions executable by the processor to determine that the UE is operating in the transition state by determining that the UE is experiencing changing channel conditions.

26. The apparatus of claim 14, wherein the memory includes instructions executable by the processor to determine that the UE is operating in the transition state by determining that a channel estimation filter is unreliable.

27. An apparatus for resource adaptation in wireless communications having a bursty transmission pattern, comprising:
 means for determining that a user equipment (UE) is operating in a transition state;
 means for transmitting, using a first numerology including a first number of symbols per slot, a first radio-frequency transmission having a first ratio of reference signal symbols to data symbols, for at least one transition slot while the UE is operating in the transition state;
 means for adapting the first numerology, in a subsequent slot after the transition state, to a scaled numerology including a second number of symbols per slot, according to a defined adaptation schedule defining a fixed number of slots in the transition state, wherein the means for adapting is configured to adjust a waveform of a symbol transmitted in the at least one transition slot to a different waveform in the subsequent slot, wherein in the at least one transition slot, the symbol carries a first sequence or a second sequence orthogonal to the first sequence, and wherein in the subsequent slot the symbol carries the first sequence or the opposite of the first sequence, and
wherein the means for transmitting is configured to transmit, using the scaled numerology, a second radio-frequency transmission having a second ratio of reference signal symbols to data symbols, in the subsequent slot, wherein the first ratio of reference signal symbols to data symbols is greater than the second ratio of reference signal symbols to data symbols.

28. A non-transitory computer readable medium for resource adaptation in wireless communications having a bursty transmission pattern comprising code for:
 determining that a user equipment (UE) is operating in a transition state;
 transmitting, using a first numerology including a first number of symbols per slot, a first radio-frequency transmission having a first ratio of reference signal symbols to data symbols, for at least one transition slot while the UE is operating in the transition state;
 adapting the first numerology, in a subsequent slot after the transition state, to a scaled numerology including a second number of symbols per slot, according to a defined adaptation schedule defining a fixed number of slots in the transition state;
 adjusting a waveform of a symbol transmitted in the at least one transition slot to a different waveform in the subsequent slot, wherein in the at least one transition slot, the symbol carries a first sequence or a second sequence orthogonal to the first sequence, and wherein in the subsequent slot the symbol carries the first sequence or the opposite of the first sequence; and
 transmitting, using the scaled numerology, a second radio-frequency transmission having a second ratio of reference signal symbols to data symbols, in the subsequent slot, wherein the first ratio of reference signal symbols to data symbols is greater than the second ratio of reference signal symbols to data symbols.

* * * * *